United States Patent [19]
Elam et al.

[11] Patent Number: 4,554,584
[45] Date of Patent: Nov. 19, 1985

[54] VIDEO AND AUDIO BLANKING SYSTEM

[76] Inventors: Carl M. Elam, 8018 Carey Branch Pl., Ft. Washington, Md. 20744; Dale A. Leavy, 7 B St., Edwards AFB, Calif. 93523

[21] Appl. No.: 512,063

[22] Filed: Jul. 8, 1983

[51] Int. Cl.⁴ .......................... H04N 3/24; H04N 7/04
[52] U.S. Cl. ...................................... 358/165; 358/147
[58] Field of Search ............... 358/147, 165, 188, 114, 358/117, 118, 120, 142

[56] References Cited

U.S. PATENT DOCUMENTS

| | | | |
|---|---|---|---|
| 3,673,318 | 6/1972 | Olsen et al. | 358/165 |
| 3,919,462 | 11/1975 | Hartung et al. | 358/117 |
| 4,245,245 | 1/1981 | Matsumoto et al. | 358/122 |
| 4,280,139 | 7/1981 | Mogi et al. | 358/165 |
| 4,333,110 | 6/1982 | Faerber et al. | 358/165 |
| 4,354,201 | 10/1982 | Sechet et al. | 358/122 |
| 4,488,179 | 12/1984 | Krüger et al. | 358/147 |

OTHER PUBLICATIONS

Sears Model 57G 5400 N Television Receiver Schematic Diagram.

Primary Examiner—Tommy P. Chin
Assistant Examiner—Michael D. Parker
Attorney, Agent, or Firm—Donald J. Singer; Bernard E. Franz

[57] ABSTRACT

An auxiliary circuit for remote control of television receiver blanking (audio and video) by digital code words transmitted as part of the video signal. The circuit detects and decodes the transmitted code and depending upon the code received, blanks either or both the audio and video signals in the receiver. A selector switch would be interconnected with the digital decoder to permit selection of particular code words which will cause the circuit to blank. The selector switch will normally be available for the television viewer to control. The transmitter for transmitting the digital code in the preferred configuration would comply with FCC Rules and Regulations specifying program related ASCII transmissions on line 21 of picture field 1.

14 Claims, 7 Drawing Figures

LAMP INTERFACE CIRCUIT

Fig. 2D

AUDIO AND VIDEO BLANKING LOGIC

VIDEO AND AUDIO BLANKING SYSTEM

RIGHTS OF THE GOVERNMENT

The invention described herein may be manufactured and used by or for the Government of the United States for all governmental purposes without the payment of any royalty.

BACKGROUND OF THE INVENTION

This invention relates to a feature for television systems, which permits selective blanking of the picture and/or muting the sound at a receiver. It makes use of the captioning or text feature.

Present regulations of the Federal Communications Commission permit program related data in the ASCII code format to be inserted by television broadcasters in the vertical blanking interval for line 21, field 1 of the baseband video signal. The information can be captioning (e.g., closed captions for the deaf) or text giving supplementary program information. Television receivers are now commercially available having a circuit for detecting the line 21 data.

There are also known TV receiver circuits for blanking the picture and/or muting the sound of a received signal. Faerber at al U.S. Pat. 4,333,110 is an editing system which makes use of the absence of picture information in a video signal before a commercial to lower the sound. In Olsen et al. U.S. Pat. No. 3,673,318, a TV receiver is provided with video blanking and sound muting during channel selection tuning. These systems do not require any special signal to be inserted in the transmitted signal.

There are also pay TV systems, such as that disclosed in Sechet et al. U.S. Pat. No. 4,354,201, in which the received signal is jammed or scrambled, unless the receiver has a special key corresponding to one included in the transmitted signal as digital data. Also of interest are two-way interactive CATV systems, such as disclosed in Matsumoto et al. U.S. Pat. No. 4,245,245.

SUMMARY OF THE INVENTION

An object of the invention is to provide a feature using a selector at the TV receiver to control the type of programming which may be viewed or heard, using a rating system, with provision for changing the selection.

The system according to the invention depends upon a rating signal being included as digital data in the transmitted signal. The digital data is detected by the existing caption circuitry of a receiver which has that feature, which converts it to eight-bit parallel form. The receiver according to the invention includes an additional rating selection circuit, which decodes the rating codes. A manual selector switch is set to a selected rating. The circuits compare the switch setting to the decoded rating, to permit viewing and hearing programs of the selected rating, while causing programs with a more restrictive rating to be blanked for the picture and/or the sound.

In the preferred embodiment the ratings may be the well-known P, PG, and R used for movies.

The novel feature of this invention is the combination of a television set equipped with a selector switch interconnected with a digital signal decoder which together allow television users to have their sets automatically perform blanking of the picture and sound. The selector switch would allow the user to select the particular digital code words, transmitted as part of the video signal, which will cause the television receiver to blank either the picture or sound. Another feature is the use of indicator lamps to signal the television user as to which code words are being received.

The invention solves the problem of allowing a television viewer the option of having program material (audio or video) automatically rejected from a receiver based upon the viewers selection of the decoder switch position. The code transmitted along with the video and audio would be mixed onto the program video signal by network or local station personnel and equipment. Selection of which ASCII code words will be sent would be determined by some criteria relating to the program in progress. For example, the code could indicate the general content of the program. Examples of the code would be:

| Program Content | ASCII Bit Pattern |
|---|---|
| 1. Educational | X1000101 |
| 2. Political | X1000110 |
| 3. Entertainment | X1000111 |

The code could also be used to indicate the movie rating (G, PG, or R) of the program. Examples of this code would be:

| Rating | ASCII Bit Pattern |
|---|---|
| 1. G | X1010100 |
| 2. PG | X1011001 |
| 3. R | X1010001 |

In these examples a single eight-bit code word is shown; however, in the implementation, two eight-bit words are required for compatibility with existing systems.

In these schemes the selection of which program types are blanked is at the discretion of the viewer and not the broadcaster. The broadcaster simply encodes signals based upon subjective judgements.

The circuit description given in this disclosure will be based upon using ASCII codes to specify the movie rating (G, PG, and R) for program material and having the television receiver blank the picture and sound whenever the rating level, based upon the ASCII code received, exceeds that selected by the viewer on the selector switch. The circuit logic can be adapted to perform blanking for other applications.

DETAILED DESCRIPTION OF THE DRAWING

Figure 1:
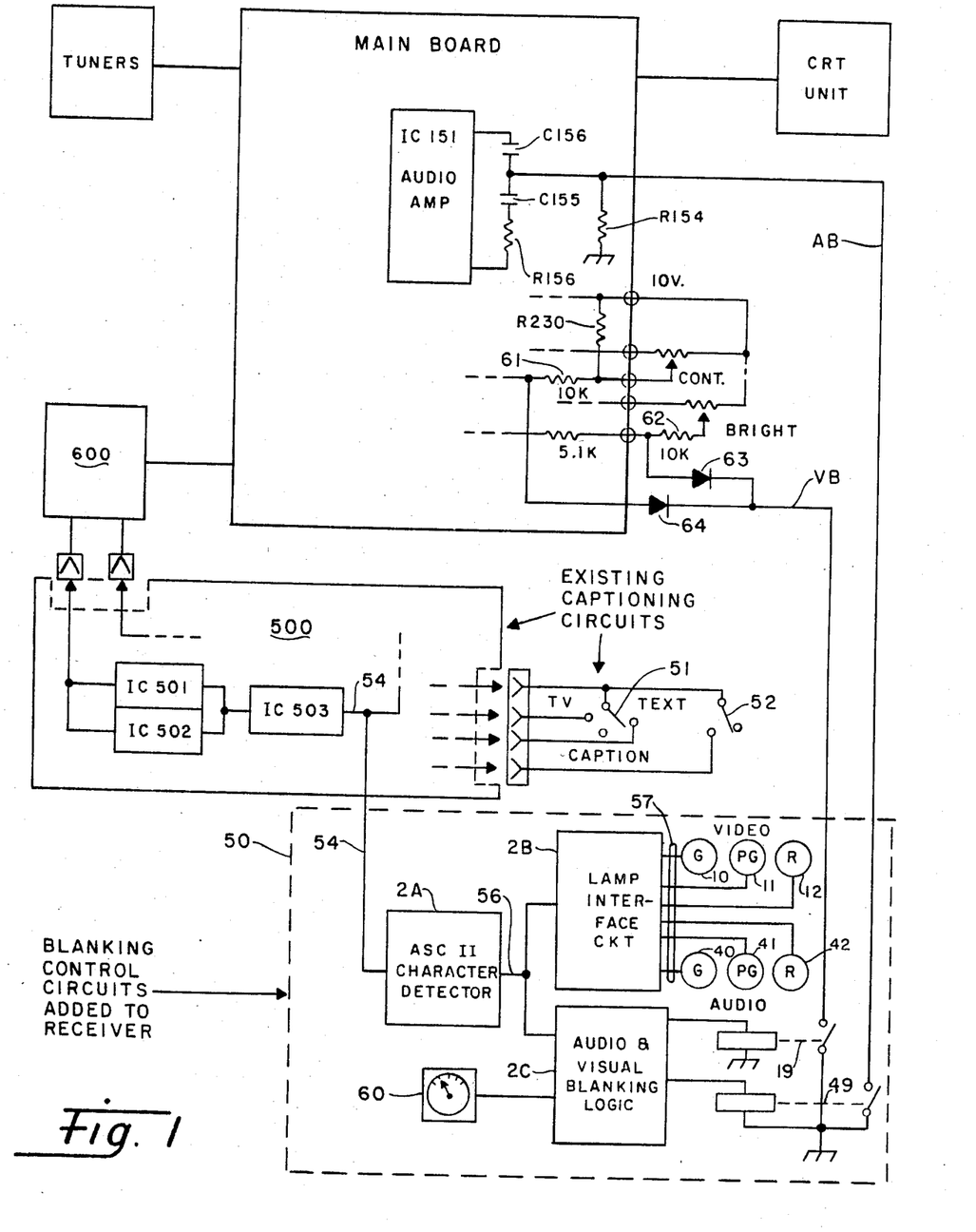
FIG. 1 is a receiver block diagram, with some circuits shown functionally or schematically.

FIG. 1 illustrates this invention which is a television receiver augmented with circuits 500 for decoding ASCII signals on picture line 21 or field 1 and circuits 50 (lower right) for blanking the audio and video in response to receipt of designated code characters. The augmenting circuit consist of the following:

1. Picture line 21 detector,
2. Serial-to-parallel data formator,

3. ASCII character detector,
4. Logic circuit for generating the audio and video blanking signals,
5. Selector switch for determining which ASCII characters will cause blanking,
6. Blanking relays for accepting the blanking signals and performing the actual blanking function, and
7. Panel lamps to give a visual indication of the code characters being received.

Figure 2A:
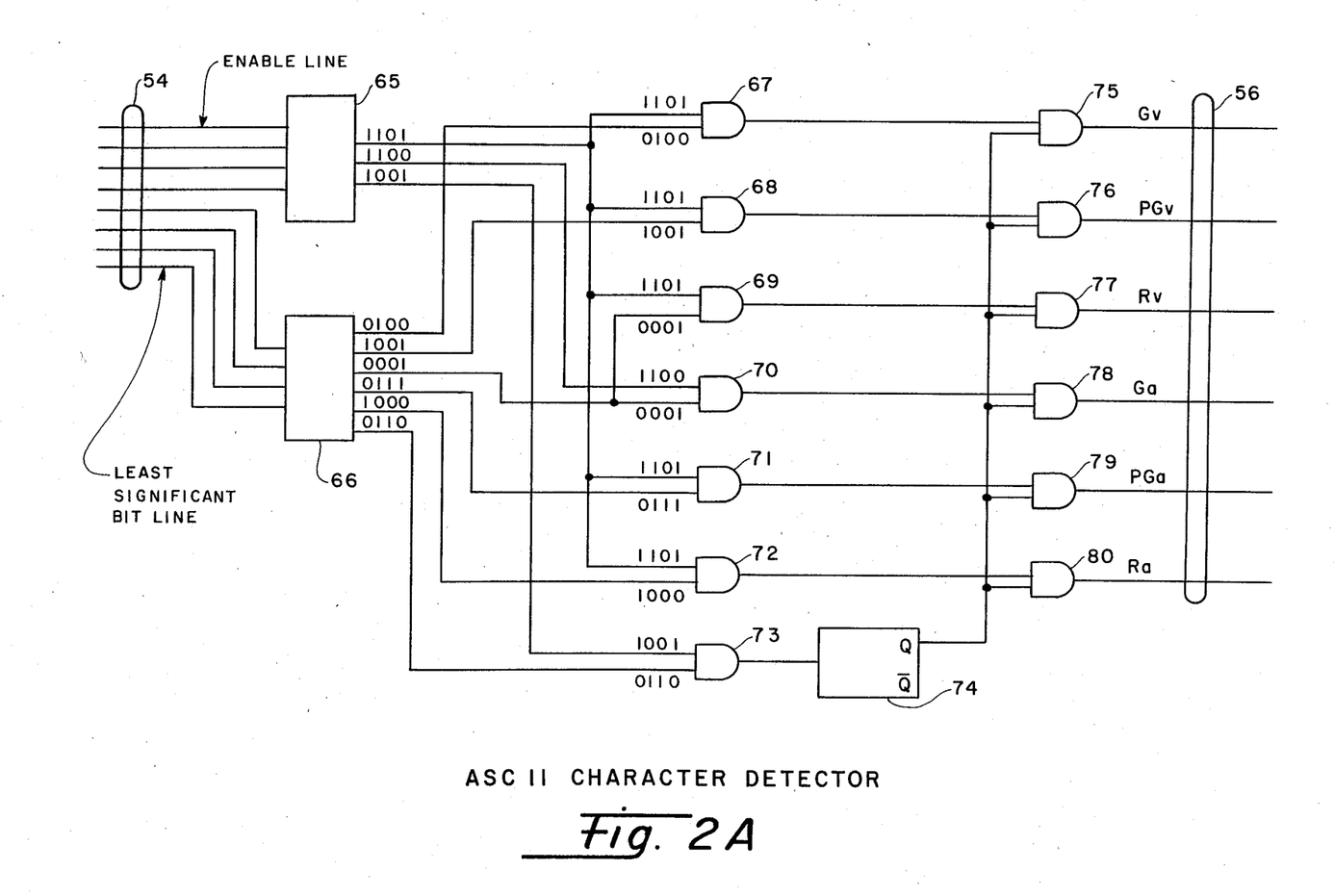
FIGS. 2A, 2B, 2C and 2D are functional block logic diagrams of the rating selection circuit.
Figure 2B:
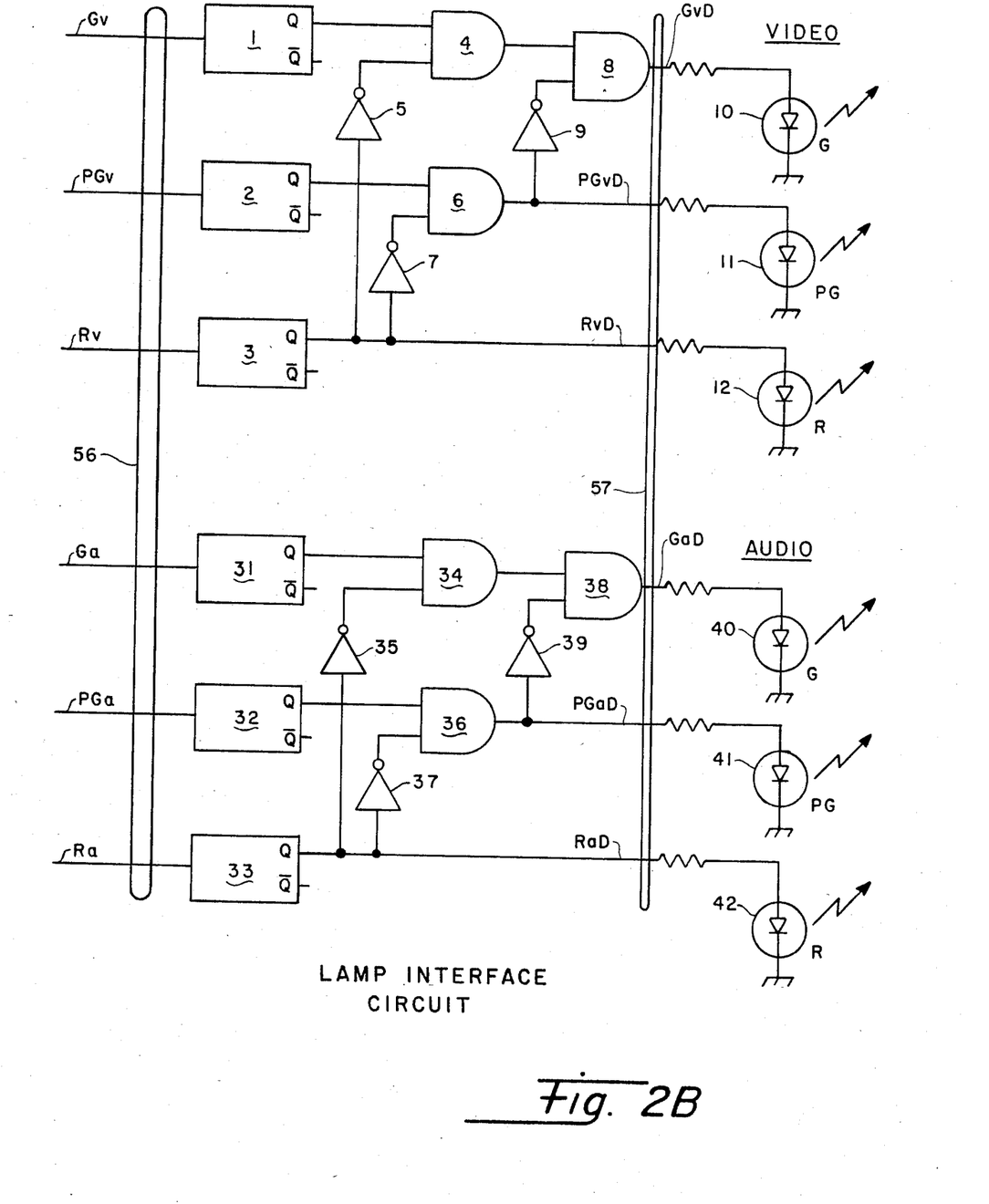
Figure 2C:
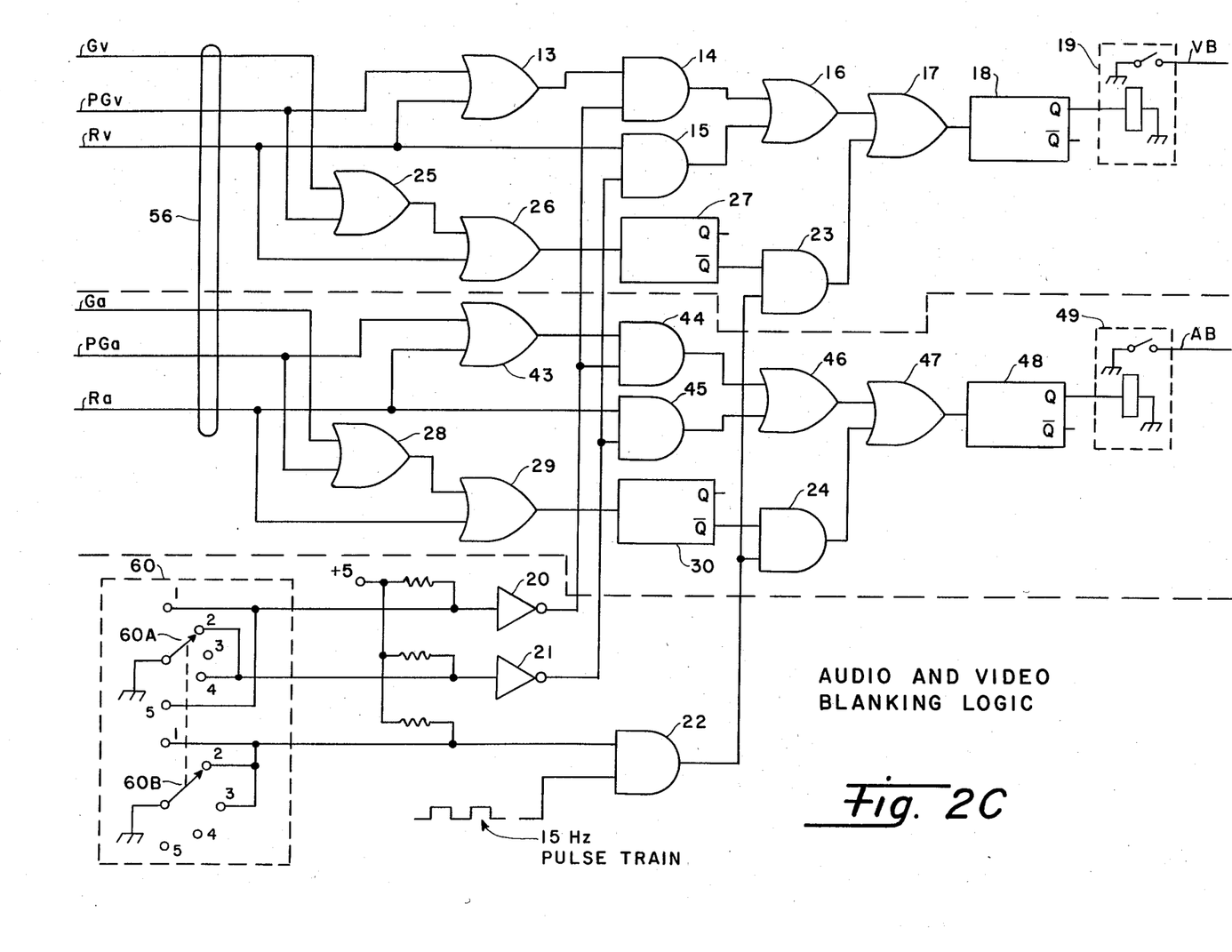

FIG. 1 illustrates the commercially available television receiver used by the inventors and the modification circuits to incorporate the features described in this disclosure. This receiver includes, as a standard feature, captioning display circuitry (500). This captioning circuit was utilized to provide the picture line 21 detection and the serial-to-parallel data conversion. FIGS. 2A, 2B and 2C illustrate the ASCII detector, logic, blanking and lamp circuits added to the receiver by the inventors.

The following paragraphs will discuss the circuit operation.

Figure 3:
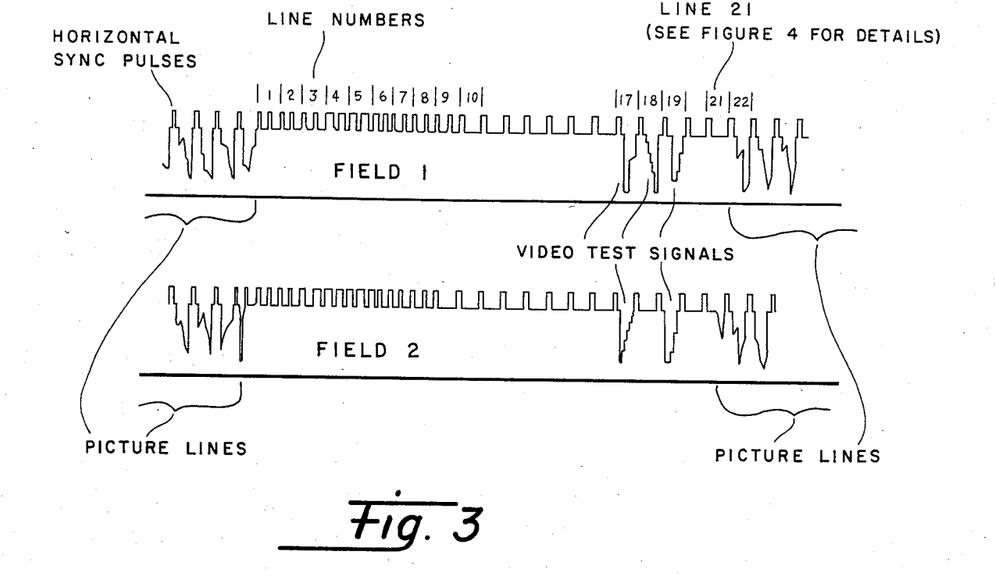
FIGS. 3 and 4 are graphs of line 21 of the video signal.
Figure 4:
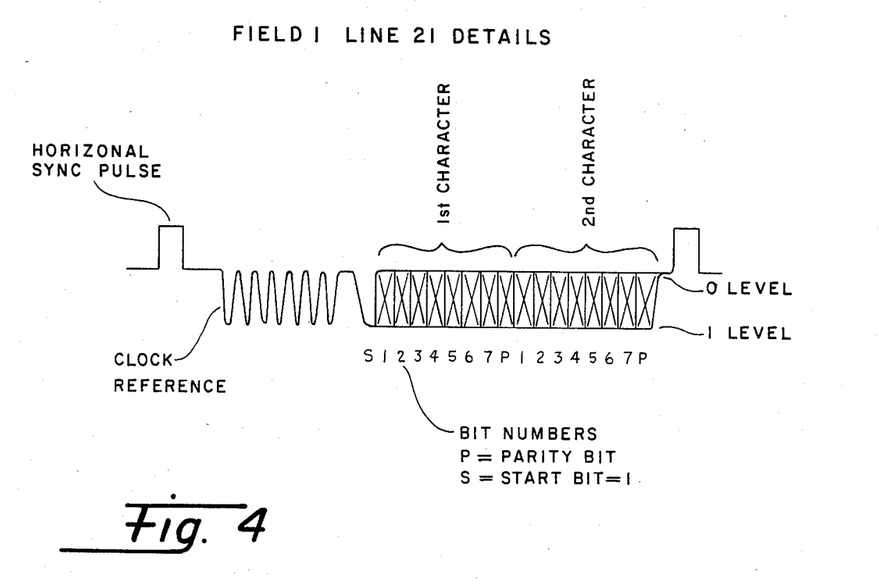

The line 21 detector (IC501 and IC502) in FIG. 1 performs the function of generating signals which alert the subsequent circuits whenever the video raster line 21 of picture field 1 is present. The line 21 detector is normally reset by the vertical synchronizing pulse and subsequently counts the horizontal synchronizing pulses until it reaches line 21. FIG. 3 illustrates the vertical blanking interval for fields 1 and 2 of video signal. FIG. 4 illustrates the serial ASCII code format for line 21 of field 1. This format is prescribed by the Federal Communications and must contain only program related data when used on television broadcasts. A method by which the line 21 detector determines the presence of frame 1, can be based upon the sinusoidal burst (clock reference) which precedes the two ASCII characters.

The serial-to-parallel data formator (IC503) takes the line 21 ASCII data bits and converts them from a serial format to an eight-line parallel format. Since two data words are present on each line 21 of field 1, they are placed on the same eight-line data bus 54 in rapid succession.

The ASCII character detector 2A shown in FIGS. 1 and 2A is connected to the eight-line parallel data bus 54 from the serial-to-parallel converter. The ASCII character detector monitors the data bus for the various digital words which specify the program rating. When rating code characters are present, the detector signals, with a pulse, the subsequent blanking logic circuit using six lines corresponding to each of the ratings of Table 1. Table 1 illustrates typical digital words which represent the rating codes for the picture and sound. Note that actually two successive eight-bit words on the same line 21 are used, this is for compatibility with the existing captioning and text transmission systems which currently use line 21.

The logic circuits, for generating the audio and video blanking signals and controlling the lamps, accept the detected rating signals from the ASCII character detector. The logic circuits are illustrated in FIGS. 2B and 2C. Normally, the interface between the detector and the logic circuit will be two sets of three lines. One set of lines provides the three video rating signals and the other set is for the three audio rating signals. A +5v pulse resulting from each received rating code character appears on one of the three audio or one of the three video lines and indicates the rating of the program material being sent. According to the codes in Table I, each code corresponds to either an audio or video rating. To properly rate a program picture and sound under these conditions requires the audio and video rating codes to be alternately sent. The circuit built by the inventors utilized the code in Table I. The circuit stretches (by means of monostable multivibrators) the +5v pulses to approximately three seconds which requires that the audio and video code be refreshed approximately every two seconds. This being the case, the audio and video codes could be alternately sent with about one second between them. Other coding schemes such as in Table II are possible; these have the advantage that a single code will convey both audio and video ratings and are, therefore, more efficient. These latter codes, however, require a more complex decoding circuit. A rating select switch 60A, for determining which ASCII characters will cause blanking, is also connected to the logic circuit. The logic circuit compares the incoming rating code with the selector switch. If the program rating, specified by the rating code, is greater (R>PG>G) than that selected on the selector switch, the logic circuits will generate a blanking signal for subsequent audio or video blanking relays.

Another selector switch 60B (code required switch) is also interfaced with the logic circuit. This switch allows the viewer two options: the first is to allow the television receiver to perform normally (unblanked) when no rating code is being received, the second is to cause the receiver to blank both the video and audio when no rating code is received. In the preferred configuration, the functions of the rating select and code required switches are combined as switch 60. Table III describes the logic of the gang switch. Note that in the logic circuits of FIGS. 2B and 2C, whenever blanking signals are present for either audio or video, timing circuits (monostable multivibrators) within the logic circuit stretch the blanking commands to approximately three seconds. With this design approach, the codes for both audio and video must be refreshed about every two seconds in order to cause continuous blanking when required.

The blanking interface with the television receiver circuits which perform the video and audio blanking function, can vary depending upon the design of the television receiver. In the circuit fabricated by the inventors video blanking was accomplished by simultaneously grounding the voltages from both the brightness control and the contrast control potentiometers as shown in FIG. 1. The audio blanking was performed by grounding the audio signal at a low signal level interstage junction also shown in FIG. 1.

In general, the rating select and code required switches that control the audio and video blanking logic may take several forms. These may include: a conventional multiposition selector switch with a knob; a multiposition selector switch that requires a key to operate; a group of several slide, pushbutton, or toggle switches; and a keyboard of switches such as is used to control a microprocessor.

TABLE I

| | Typical ASCII Rating Codes | |
| --- | --- | --- |
| | First Characters | Second Character |
| Gv | X0010110 | X1010100 |
| PGv | X0010110 | X1011001 |
| Rv | X0010110 | X1010001 |
| Ga | X0010110 | X1000001 |

TABLE I-continued

| Typical ASCII Rating Codes | | |
|---|---|---|
| | First Characters | Second Character |
| PGa | X0010110 | X1010111 |
| Ra | X0010110 | X1011000 |

X is a parity bit.

TABLE II

| Alternate ASCII Rating Codes | | | |
|---|---|---|---|
| Video Rating | Audio Rating | First Character | Second Character |
| G | G | X0010110 | X1010000 |
| G | PG | X0010110 | X1010001 |
| G | R | X0010110 | X1010010 |
| PG | G | X0010110 | X1010011 |
| PG | PG | X0010110 | X1010100 |
| PG | R | X0010110 | X1010101 |
| R | G | X0010110 | X1010110 |
| R | PG | X0010110 | X1010111 |
| R | R | X0010110 | X1011000 |

X is a parity bit

TABLE III

| Switch Position | Switch Position Rating | Blank if Code N0T Present |
|---|---|---|
| 1 | G | No |
| 2 | PG | No |
| 3 | R | No |
| 4 | PG | Yes |
| 5 | G | Yes |

The block diagram of FIG. 1 represents the Sears Model 57 G 5400N television receiver, manufactured for Sears by Sanyo Corporation, which was modified to provide a prototype to test the invention. The basic receiver comprises a main circuit board, plus the tuners and a cathode ray tube unit. This receiver also comes with boards 500 and 600 for captioning circuits. Connected to board 500 by a plug and jack are a three-position switch 51 and a two-position switch 52. The positions of switch 51 are designated TV, caption and text. Switch 52 provides additional control of the captioning display. An auxiliary unit 50 was added to the receiver by the inventors to provide the blanking control logic. A copy of the circuit diagram of the receiver with the blanking control circuits added thereon is attached hereto as an appendix and incorporated herein by reference.

The circuit 500 comprises ten integrated circuit chips, and several transistors, resistors, capacitors and diodes. Three of the integrated circuit chips are shown in FIG. 1 as blocks. The two chips IC501 and IC502 separate the line 21 data from the video signal. The chip IC503 converts the data to parallel form on an eight-conductor data bus 54. These eight conductors were tapped and used as the data input to the auxiliary unit 50. (Note that it is not necessary to use a receiver equipped with a complete captioning circuit, and instead a simplified add-on circuit including chips such as IC501, IC502 and IC503 could be used.)

The blanking control unit 50 comprises decoding circuits 2A, a lamp interface circuit 2B with six lamps, and blanking logic 2C with two output relays. The coder 2A comprises decoding logic for the six (Table I), or nine (Table II) characters used for rating. In the embodiment which was tested, six characters are decoded and the output line 56 has six conductors. All six conductors go to both the blanking logic 2C and the lamp circuit 2B, as shown in FIGS. 2C and 2B, as follows:

Gv is the video "G" rating signal line.
PGv is the video "PG" rating signal line.
Rv is the video "R" rating signal line.
Ga is the audio "G" rating signal line.
PGa is the audio "PG" rating signal line.
Ra is the audio "R" rating signal line.

Signals on these lines are +5v pulses, which are approximately 100 microseconds in duration.

The components in FIGS. 2A, 2B and 2C are AND gates, OR gates, inverters, monostable multivibrators, and decoders such as may be selected from the 7400 series of integrated circuits. General notes to these circuits follow.

1. The Q signals from the monostable multivibrators are approximately 3 seconds in duration, except in FIG. 2A for the unit 74 the Q signal has a duration of 200 microseconds.
2. Components 1 through 9 control the video rating lamps 10-12.
3. Components 13 through 18 control the video blanking relay 19.
4. Components 31 through 39 control the audio rating lamps 40-42.
5. Components 43 through 48 control the audio blanking relay 49.
6. Components 25 through 27 generate the video code not present signal.
7. Components 28 through 30 generate the audio code not present signal.
8. Components 22 through 24 generate blanking pulses whenever the codes are not present and the "Code Required Switch" 60B is in position 4 or 5.
9. The "inverters" and "and-gates" preceding the light emitting diodes (LED) prevent illumination of more than one LED simultaneously and give priority to the higher ratings LEDs.
10. When the "code required" switch 60B is in position 4 or 5, and the rating codes are not present, the 15Hz pulse train will repeatedly trigger monostable multivibrators 18 and 48 thus continuously blanking the audio and video.
11. A high (Q) signal at the relays will cause blanking.
12. A single common rating select switch controls both the audio and video circuits; two separate rating select switches could have been used to separately select the audio and video ratings.
13. Components 65 and 66 are 4-line-to-16-line decoders. Not all output lines are used. Decoder 65 decodes the enable line and the most significant bits while decoder 66 decodes the least significant bits. Components 67 through 73 are AND gates for combining the most and least significant bit decoder outputs.
14. Component 74 is a 200-microsecond multivibrator which is set in response to the first character of the rating code.
15. Component 75 through 80 are AND gates which allow passage of a pulse to the rating lines 56 whenever the first and second characters correspond to a valid rating code.

FIG. 2A illustrates the details of a detector circuit which will decode the two successive eight-bit words. The circuit monitors the eight parallel input data lines 54 which carry seven character bits (parity bit is not used) and an enable pulse (approximately 100 ms and is present only when the data is on the bus). Whenever the detector receives the first character of the rating codes (Table I and FIG. 4) it sets the monostable 74 which remains set for approximately 200 ms and enables the six AND gates 75 through 80. If the second character received corresponds with one of the established rating codes, the detector will send a pulse (approximately 100 microseconds) to one of the six output AND gates 75 through 80. Whenever both the first and second characters correspond to a particular rating (Table I) a pulse will be sent from the corresponding output AND gate of the ASCII Character Detector to the subsequent circuits.

In FIG. 2B, a signal on any of the six lines of cable 56 will set the corresponding monostable multivibrators 1, 2, 3, 31, 32, 33 for three seconds. If the signal is repeated more frequently than every three seconds, the monostable will remain set. With signals on line Gv, the Q output of monostable 1, via AND gates 4 and 8 and a resistor, operates the light emitting diode 10. With signals on line PGv, the Q output of monostable 2, via AND gate 6 and a resistor operates light emitting diode 11, and via inverter 9 inhibits gate 8 so that diode 10 will not operate. With signals on line Rv, the Q output of monostable 3, via a resistor, operates light emitting diode 12, and via inverters 5 and 7 inhibits gates 4 and 6 respectively, so that diodes 10 and 11 will not operate.

The logic components 31–39 are connected the same as logic components 1–9, so that signals on line Ga operate light emitting diode 40, signals on line PGa operate light emitting diode 41 and inhibit operation of diode 40, and signals on line Ra operate light emitting diode 42 and inhibit operation of diodes 40 and 41.

In FIG. 2C, the switch 60 comprises a "rating select switch" 60A and a "code required switch" 60B ganged together to form a five-position, two-pole switch. The switch positions are shown in Table III, with the second column for switch 60A and the third column for switch 60B.

With no rating signals received on any of the six lines of cable 56, the monostable multivibrators 27 and 30 remain in the reset condition, with the $\overline{Q}$ outputs high. With switch 60 in position 1, 2 or 3, ground (a low signal) via pole 60B inhibits AND gate 22, which in turn inhibits AND gates 23 and 24. The monostable multivibrators 18 and 48 remain in the reset condition, and the blanking output relays 19 and 49 are not operated. This is the no blanking if code not present situation.

With no rating signals received, and switch 60 in position 4 or 5, gate 22 is enabled by the plus five-volt potential via a resistor, to gate the 15-hertz pulse train to gates 23 and 24. The pulse train passes via AND gate 23 and OR gate 17 to the input of monostable 18, and via AND gate 24 and OR gate 47 to the input of monostable 48. The monostables then operate, and are retriggered fifteen times per second to remain operated. The relays 19 and 49 are then operated to apply ground signals to leads VB and AB to cause blanking of the picture and sound. This is the blank if code not present condition.

If a rating signal is present on one of the three video rating lines Gv, PGv or Rv, the signal via OR gates 25 and 26 triggers the monotable 27. With the $\overline{Q}$ output of monostable 27 low, AND gate 23 is inhibited to block the 15-hertz pulse train from reaching the input of monostable 18, regardless of the position of switch 60. Note that gates 25 and 26 together provide a three-input OR function, and could be replaced by a single three-input OR gate. In like manner, if a rating signal is present on one of the three audio rating lines Ga, PGa or Ra, the signal via OR gates 28 and 29 triggers the monostable 30; which blocks the 15-hertz pulse from reaching monostable 48 via gates 24 and 47.

If the switch 60 is in either of the "G" positions 1 or 5, the ground potential from pole 60A, via inverter 20, provides a high input to AND gates 14 and 44. A signal on line Gv or Ga has no effect on the output, and relays 19 and 49 remain normal. The program can be seen and heard. However, a signal on either line PGv or Rv, via OR gate 13, AND gate 14 and OR gates 16 and 17, triggers the monostable 18. Relay 19 operates to apply the ground blanking potential on lead VB. In like manner, a signal on either of lines PGa or Ra, via OR gate 43, AND gate 44, and OR gates 46 and 47 trigger monostable 48, to operate relay 49 and apply ground to lead AB.

If switch 60 is in either of the PG positions 2 or 4, ground from pole 60A via inverter 21 supplies a high input to AND gates 15 and 45. Then signals on any of the lines Gv, PGv, Ga or PGa will have no effect on the outputs, and relays 19 and 49 remain normal. The program can be seen and heard. A signal on line Rv, via AND gate 15, and OR gates 16 and 17 trigger monostable 18 to operate relay 19, and apply blanking ground to lead VB. Similarly, a signal on line Ra, via AND gate 45, and OR gates 46 and 47, triggers monostable 48 to operate relay 49, and apply blanking ground on lead AB.

If switch 60 is in the "R" position 3, signals on any of the six lines of cable 56 have no effect on the output, and relays 19 and 49 remain normal. The program can be seen and heard.

Figure 2D:
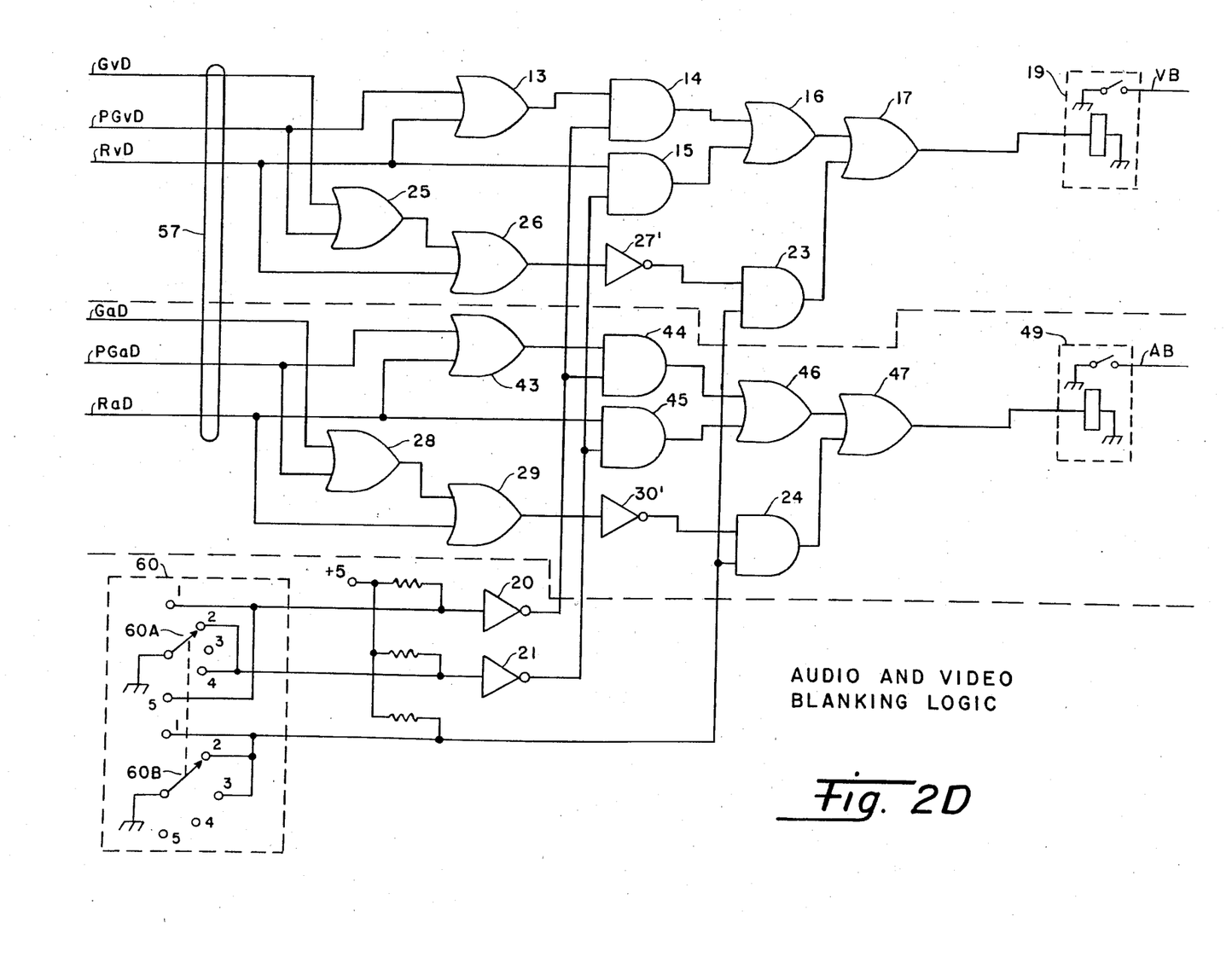

An alternate configuration for circuit 2C is shown in FIG. 2D described as follows:
1. Monostable multivibrators 18 and 48 are deleted;
2. Monostable multivibrators 27 and 30 are replaced with inverters 27' and 30';
3. The 15 Hz pulse train is replaced with +5v, or AND gate 22 is omitted as shown; and
4. The six input lines are disconnected from cable 56 and connected instead to the output line 57 comprising the six leads GvD, PGvD, RvD, GaD, PGaD, and RaD of circuit 2B (ahead of the resistors).

This configuration allows equivalent performance with fewer multivibrators and their associated external resistors and capacitors.

The normal circuit for the receiver includes four potentiometer controls designated contrast, tint, color and brightness, which are separate from the main circuit board, but connected thereto. The two controls for contrast and brightness are shown in FIG. 1. These have one end of the resistor connected to a 10-volt DC bias line, with the other end of the resistor and the moving contact connected to video and chroma circuits. The normal circuits include a resistor R230 between the 10-volt line and the contrast control moving contact. The receiver has been modified by inserting 10.000-ohm resistors 61 and 62 in series with the moving contacts of the contrast and brightness controls, to prevent grounding of the 10-volt line when a blanking relay is operated. The other end of these resistors 61, 62 are connected via diodes 63 and 64 respectively to the video blanking lead VB. Then ground potential on lead VB blanks the picture.

The receiver also has an audio amplifier which includes an integrated circuit IC151. The capacitors C155 and C156, and resistors R156 and R154 are a normal part of the audio amplifier at a low signal level. The circuit has been modified by connecting the junction point of capacitors C155 and C156 and resistor R154 to the lead AB. Then ground potential on lead AB blanks or mutes the sound output.

Alternative methods of blanking the video and sound are disclosed in some of the patents referenced in the "BACKGROUND" section.

An alternative method of displaying the rating, in place of lamps 10-12 and 40-42, would be to generate a display to be mixed with the video signal, which could be seen on a small area on the face of the picture tube, like a digital time signal is displayed on some TV receivers.

Note that the captioning or text feature of the TV receiver can be used at the same time as the auxiliary rating circuit. The rating codes must be chosen such that they do not correspond to any of the characters used for captioning or text. The normal captioning circuit select switches 51 and 52 can be in any position when the rating circuit is used.

Thus, while preferred constructional features of the invention are embodied in the structure illustrated herein, it is to be understood that changes and variations may be made by the skilled in the art without departing from the spirit and scope of our invention.

We claim:

1. A television editing system activated by transmitted digital codes for blanking at least part of the output of a receiver, in which the receiver includes at least a portion of a captioning circuit means for detecting digital data if present in the transmitted signal and supplying the data to a data bus;

wherein said editing system comprises an auxiliary circuit which includes a character detector, rating select switch means, and blanking logic means;

the character detector having inputs coupled to said data bus, means for decoding predetermined digital codes of a special set of characters, and output to rating signal lines, there being a separate rating signal line for each character of said special set;

the rating select switch means having settings for different ratings; and the blanking logic means having logic circuits coupled to the rating signal lines and to the rating select switch means to compare the switch setting to signals on the rating signal lines, and in response to the comparison to generate a logic output signal condition for selectively either blanking or not blanking at least part of the receiver output.

2. A television editing system according to claim 1, wherein said auxiliary circuit includes display means coupled to said rating signal lines for displaying the rating corresponding to the signals on the rating signal lines.

3. A television editing system according to claim 2, wherein said receiver output comprises video output to a picture tube and audio output to a sound transducer, and the receiver is adapted to include video output blanking means and audio output blanking means, both coupled to said auxiliary circuit to use said logic output signal condition.

4. A television editing system according to claim 3, wherein said special set of characters correspond to ratings in a hierarchy ranging from most restrictive to least restrictive, and the blanking logic means is arranged to give precedence in blanking to the more restrictive rating if more than one is being received.

5. A television editing system according to claim 4, wherein said blanking logic means comprises video blanking logic means with an output connected to control said video output blanking means in the receiver, and audio blanking logic means with an output connected to control said audio output blanking means in the receiver;

and wherein there are separate rating signal lines to the video and the audio blanking logic means, each having a hierarchy operating separate from the other.

6. A television editing system according to claim 5, wherein the video and the audio blanking logic means each includes an output monostable multivibrator which is triggered in response to a signal on a rating line more restrictive than the setting of the rating select switch means, each output monostable multivibrator remaining set after triggering for a given interval, so that rating signals repeated with a shorter interval will retrigger to prevent resetting, and said logic output signal condition produces blanking of video and/or audio according to the output monostable multivibrators of the video and/or audio blanking logic means being set.

7. A television editing system according to claim 6, which further includes "rating required" switch means having settings for "required" and "not required", the video and audio blanking logic each having a second monostable multivibrator, the second monostable vibrator in the viedo blanking logic being triggered in response to a signal on any of the rating lines for video rating, the second monostable multivibrator in the audio blanking logic being triggered in response to a signal on any of the rating lines for audio rating, each second monostable multivibrator remaining set after triggering for a given interval, so that rating signals repeated with a shorter interval will retrigger to prevent resetting, and gate means for rating required control with inputs from the "rating required" switch means, from the second monostable multivibrators and from a pulse source providing a pulse train having intervals shorter than said given interval, so that in response to the "rating required" sitch means having a "rating required" setting and the second monostable multivibrator being "not set" in the video or audio blanking logic the corresponding output monostable multivibrator is continuously triggered to remain set.

8. A television editing system according to claim 7, wherein there are rating lines for first, second and third ratings from least to most restrictive for each of the video and audio blanking logic, wherein the video and audio blanking logic each include a first AND gate having one input coupled to the rating select switch means to be enabled with a setting for the first rating, and another input coupled via an OR gate to the rating lines for the second and third ratings; a second AND gate having one input coupled to the rating select switch means to be enabled with a setting for the second rating, and another input coupled to the rating line for the third rating; OR gate means coupling all three rating lines to the input of the second monostable multivibrator; said gate means comprising a third AND gate having one input from the $\overline{Q}$ output of the second multivibrator, and another input from a common AND gate; output OR gate means having inputs from the first, second and third AND gates, and an output to the trigger input of the output monostable multivibrator; and output switch means connected to the output of the output monostable multivibrator which when operated applies the blanking potential;

said common AND gate having one input from the "rating required" switch means to be enabled with "rating required" settings, and another input from said pulse source.

9. A television editing system according to claim 8, wherein said display means includes each rating line being coupled to the trigger input of a monostable multivibrator individual to that line, each such monostable multivibrator having an output coupled to an illumination device.

10. A television editing system according to claim 9, wherein the display means is divided into video rating display means and audio rating display means, each having gate means between the outputs of the monostable multivibrators and the illumination devices, such that only one video rating illumination device and only one audio rating illumination device may be on at any time, and the others are inhibited, preference being given to the most restrictive rating.

11. A television editing system according to claim 8, wherein the output switch means of the audio blanking logic is connected to an audio amplifier of the receiver to shunt the audio signal; and the output switch means of the video blanking logic is connected to illumination control circuits of the receiver to bias off the video signal.

12. A television editing system according to claim 5, wherein said display means includes each rating line being coupled to the trigger input of a monostable multivibrator individual to that line, each such monostable multivibrator having an output coupled to an illumination respective device.

13. A television editing system according to claim 12, wherein said coupling of the blanking logic means to the rating signal lines comprises coupling the blanking logic means to said display means between said monostable multivibrators and said illumination devices.

14. A television editing system according to claim 13, wherein the display means is divided into video rating display means and audio rating display means, each having gate means between the outputs of the monostable multivibrators and the illumination devices, such that only one video rating illumination device and only one audio rating illumination device may be on at any time, and the others are inhibited, preference being given to the most restrictive rating; with the coupling to the blanking logic means including the gate means of the display means.

* * * * *

UNITED STATES PATENT AND TRADEMARK OFFICE
CERTIFICATE OF CORRECTION

PATENT NO. : 4,554,584

DATED : November 19, 1985

INVENTOR(S) : Carl M. Elam et al

It is certified that error appears in the above-identified patent and that said Letters Patent is hereby corrected as shown below:

At column 10, line 43, "sitch" should read "switch".

At column 12, lines 10-11, "illumination" should follow "respective".

Signed and Sealed this

Eighth Day of April 1986

[SEAL]

Attest:

DONALD J. QUIGG

Attesting Officer

Commissioner of Patents and Trademarks

REEXAMINATION CERTIFICATE (3473rd)
United States Patent [19]
Elam et al.

[11] B1 4,554,584
[45] Certificate Issued  Apr. 7, 1998

[54] VIDEO AND AUDIO BLANKING SYSTEM

[75] Inventors: Carl M. Elam, Ft. Washington, Md.;
Dale A. Leavy, Edwards AFB, Calif.

[73] Assignee: H. Lee Browne, Greenwich, Conn.

Reexamination Request:
No. 90/004,320, Aug. 1, 1996

Reexamination Certificate for:
Patent No.: 4,554,584
Issued: Nov. 19, 1985
Appl. No.: 512,063
Filed: Jul. 8, 1983

Certificate of Correction issued Apr. 8, 1986.

[51] Int. Cl.$^6$ .................. H04N 3/24; H04N 7/04
[52] U.S. Cl. .................. 348/634; 348/461; 348/476; 348/478; 348/553; 348/633
[58] Field of Search .................. 348/634, 461, 348/476, 553, 633, 462, 473, 478

[56] References Cited

U.S. PATENT DOCUMENTS

| | | | |
|---|---|---|---|
| 3,624,289 | 11/1971 | Dudley | 178/7.3 E |
| 3,624,516 | 11/1971 | Rando | 328/14 |
| 3,790,700 | 2/1974 | Callais et al. | 178/5.1 |
| 4,021,849 | 5/1977 | Wheeler | 358/165 |
| 4,104,486 | 8/1978 | Martin et al. | 179/2 |
| 4,126,762 | 11/1978 | Martin et al. | 179/2 A |
| 4,163,254 | 7/1979 | Block et al. | 358/122 |
| 4,225,884 | 9/1980 | Block et al. | 358/122 |
| 4,390,901 | 6/1983 | Keiser | 358/147 |
| 4,461,032 | 7/1984 | Skerlos | 358/86 |
| 4,484,217 | 11/1984 | Block et al. | 358/84 |
| 4,520,404 | 5/1985 | Von Kohorn | 358/335 |
| 4,528,589 | 7/1985 | Block et al. | 358/122 |
| 4,536,791 | 8/1985 | Campbell et al. | 358/122 |
| 4,598,288 | 7/1986 | Yarbrough et al. | 358/120 |
| 4,605,964 | 8/1986 | Chard | 358/147 |
| 4,605,973 | 8/1986 | Von Kohorn | 358/335 |
| 4,621,285 | 11/1986 | Schilling et al. | 358/120 |
| 4,740,834 | 4/1988 | Mobarry | 358/84 |
| 4,750,052 | 6/1988 | Poppy et al. | 358/335 |
| 4,752,834 | 6/1988 | Koombes | 358/335 |
| 4,782,401 | 11/1988 | Faerber et al. | 358/335 |
| 4,930,158 | 5/1990 | Vogel | 348/1 |
| 5,214,556 | 5/1993 | Kilbel | 360/137 |
| 5,253,066 | 10/1993 | Vogel | 348/460 |
| 5,369,440 | 11/1994 | Sussman | 348/462 |
| 5,387,942 | 2/1995 | Lemelson | 348/553 |
| 5,434,678 | 7/1995 | Abecassis | 386/128 |
| 5,561,457 | 10/1996 | Cragun et al. | 348/553 |

FOREIGN PATENT DOCUMENTS

| | | | |
|---|---|---|---|
| 509088 | 6/1976 | Australia | H04N 7/00 |
| WO 81/00945 | 4/1981 | WIPO | H04N 5/48 |
| WO 83/02208 | 6/1983 | WIPO | H04N 7/04 |

OTHER PUBLICATIONS

RCA Technical Overview of Digital Satellite System.

*Primary Examiner*—John K. Peng

[57] ABSTRACT

An auxiliary circuit for remote control of television receiver blanking (audio and video) by digital code words transmitted as part of the video signal. The circuit detects and decodes the transmitted code and depending upon the code received, blanks either or both the audio and video signals in the receiver. A selector switch would be interconnected with the digital decoder to permit selection of particular code words which will cause the circuit to blank. The selector switch will normally be available for the television viewer to control. The transmitter for transmitting the digital code in the preferred configuration would comply with FCC Rules and Regulations specifying program related ASCII transmissions on line 21 of picture field 1.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-14 is confirmed.

New claims 15-31 are added and determined to be patentable.

*15. A television editing system according to claim 1 wherein said receiver output comprises video output to a picture tube and audio output to a sound transducer, and the receiver is adapted to include video output blanking means and audio output blanking means, both coupled to said auxiliary circuit to use said logic output signal condition.*

*16. A television editing system according to claim 1 wherein said special set of characters correspond to ratings in a hierarchy ranging from most restrictive to least restrictive, and the blanking logic means is arranged to give precedence in blanking to the more restrictive rating if more than one is being received.*

*17. A television editing system according to claim 15 wherein said blanking logic means comprises video blanking logic means with an output connected to control said video output blanking means in the receiver, and audio blanking logic means with an output connected to control said audio output blanking means in the receiver;*

*and wherein there are separate rating signal lines to the video and the audio blanking logic means, each having a hierarchy operating separate from the other.*

*18. A television editing system according to claim 1 wherein said blanking logic means include an output monostable multivibrator which is triggered in response to a signal on a rating line more restrictive than the setting of the rating select switch means, each output monostable multivibrator remaining set after triggering for a given interval, so that rating signals repeated with a shorter interval will retrigger to prevent resetting, and said logic output signal condition produces blanking of video and/or audio according to the output monostable multivibrators of the video and/or audio blanking logic means being set.*

*19. A television editing means according to claim 18 which further include "rating required" switch means having settings for "required" and "not required", the blanking logic having a second monostable multivibrator, the second monostable vibrator being triggered in response to a signal on any of the rating lines, said second monostable multivibrator remaining set after triggering for a given interval, so that rating signals repeated with a shorter interval will retrigger to prevent resetting, and gate means for rating required control with inputs from the "rating required" switch means, from the second monostable multivibrators and from a pulse source providing a pulse train having intervals shorter than said given interval, so that in response to the "rating required" switch means having a "rating required" setting and the second monostable multivibrator being "not set" in the video or audio blanking logic the corresponding output monostable multivibrator is continuously triggered to remain set.*

*20. A television editing system according to claim 19 wherein there are rating lines for first, second amd third ratings from least to most restrictive;*

*wherein the blanking logic includes a first AND gate having one input coupled to the rating select switch means to be enabled with a setting for the first rating, and another input coupled via an OR gate to the rating lines for the second and third ratings; a second AND gate having one input coupled to the rating select switch means to be enabled with a setting for the second rating, and another input coupled to the rating line for the third rating; OR gate means coupling all three rating lines to the input of the second monostable multivibrator; said gate means comprising a third AND gate having one input from the Q output of the second multivibrator, and another input from a fourth AND gate; output OR gate means having inputs from the first, second and third AND gates, and an output to the trigger input of the output monostable multivibrator; and output switch means connected to the output of the output monostable multivibrator which when operated applies the blanking potential;*

*said fourth AND gate having one input from the "rating required" switch means to be enabled with "rating required" settings, and another input from said pulse source.*

*21. A television editing system according to claim 2 wherein said display means includes each rating line being coupled to the trigger input of a monostable multivibrator individual to that line, each such monostable multivibrator having an output coupled to an illumination device.*

*22. A television editing system according to claim 21 wherein the display means is divided into video rating display means and audio rating display means, each having gate means between the outputs of the monostable multivibrators and the illumination devices, such that only one video rating illumination device and only one audio rating illumination device may be on at any time, and the others are inhibited, preference being given to the most restrictive rating.*

*23. A television editing system according to claim 20 wherein the output switch means of the audio blanking logic is connected to an audio amplifier of the receiver to shunt the audio signal; and*

*the output switch means of the video blanking logic is connected to illumination control circuits of the receiver to bias off the video signal.*

*24. A television editing system according to claim 17 wherein said display means includes each rating line being coupled to the trigger input of a monostable multivibrator individual to that line, each such monostable multivibrator having an output coupled to an illumination respective device.*

*25. A television editing system according to claim 24 wherein said coupling of the blanking logic means to the rating signal lines comprises coupling the blanking logic means to said display means between said monostable multivibrators and said illumination devices.*

*26. A television editing system according to claim 25 wherein the display means is divided into video rating display means and audio rating display means, each having gate means between the outputs of the monostable multivibrators and the illumination devices, such that only one video rating illumination device and only one audio rating illumination device may be on at any time, and the others are* inhibited, preference being given to the most restrictive rating; with the coupling to the blanking logic means including the gate means of the display means.

27. A television editing system as defined in claim 1 wherein said special set of characters comprises at least one first character having a predetermined digital code indicative of the transmission of a program rating and which is not recognized by said captioning system as textual data, and at least one second character having a digital code indicative of the program rating and which is not recognized as textual data by said captioning system as a consequence of the prior occurrence of said first character.

28. A television rating system as defined in claim 27 wherein said second character occurs immediately following said first character.

29. A television editing system as defined by claims 1 or 28 wherein said captioning circuit means detect digital data in line 21 in the vertical blanking interval of the transmitted signal.

30. A television editing system as defined by claims 1 or 28 wherein said special characters each comprise a single byte consisting of eight bits.

31. A television editing system as defined by claims 1 or 28 wherein said special characters each comprise a single byte consisting of eight bits and are contained in line 21 in the vertical blanking interval of the transmitted signal.

* * * * *